United States Patent
Bitar

(10) Patent No.: US 7,974,207 B2
(45) Date of Patent: *Jul. 5, 2011

(54) BANDWIDTH-BASED ADMISSION CONTROL MECHANISM

(75) Inventor: Nabil N. Bitar, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,662

(22) Filed: Apr. 9, 2010

(65) Prior Publication Data

US 2010/0195530 A1 Aug. 5, 2010

Related U.S. Application Data

(63) Continuation of application No. 11/769,219, filed on Jun. 27, 2007, now Pat. No. 7,724,668.

(51) Int. Cl.
*H04J 1/16* (2006.01)

(52) U.S. Cl. .......................... 370/235; 370/244; 370/468

(58) Field of Classification Search .................. 370/216, 370/217, 218, 241, 242, 248, 245, 351, 389, 370/395.1, 395.4, 395.41, 395.42, 395.43, 370/464, 465, 468
See application file for complete search history.

(56) References Cited

U.S. PATENT DOCUMENTS

| | | | |
|---|---|---|---|
| 7,724,668 B2 * | 5/2010 | Bitar | 370/235 |
| 2003/0002531 A1 * | 1/2003 | Charzinski et al. | 370/468 |
| 2003/0236887 A1 | 12/2003 | Kesselman et al. | |
| 2004/0228278 A1 * | 11/2004 | Bruckman et al. | 370/231 |
| 2008/0316921 A1 | 12/2008 | Mathews et al. | |

* cited by examiner

*Primary Examiner* — Kwang B Yao
*Assistant Examiner* — Obaidul Huq

(57) ABSTRACT

A device generates a service protection factor ($SPF_i$) for links (N) on a link aggregation group (LAG), determines a traffic allocation bandwidth on the LAG for a service class based on the service protection factor ($SPF_i$) and a congestion guard factor ($CGF_i$), and restricts the traffic allocation bandwidth on the LAG. The service protection factor ($SPF_i$) may guarantee a service availability target in the presence of link failure, and the congestion guard factor ($CGF_i$) may protect against link overload that may arise from imperfectness in traffic load balancing across links in the LAG.

21 Claims, 6 Drawing Sheets

BANDWIDTH-BASED ADMISSION CONTROL MECHANISM

RELATED APPLICATION

This application is a continuation of U.S. patent application Ser. No. 11/769,219, filed Jun. 27, 2007, which is incorporated herein by reference.

BACKGROUND INFORMATION

A link aggregation (e.g., as set forth in IEEE 802.3ad) is a computer networking term which describes using multiple links (e.g., Ethernet network cables and/or ports in parallel) as one logical port to increase the link speed beyond the limits of any one single link. Other terms used for link aggregation may include Ethernet trunking, port teaming, NIC bonding, link bundling, and/or link aggregation group (LAG). LAG will be used hereinafter to refer to link aggregation.

LAG is an inexpensive way to set up a high-speed backbone network that may transfer more datagrams (e.g., traffic) than any one single port or device can support. A "datagram(s)" may include any type or form of data, such as packet or non-packet data. LAG may permit several devices to communicate simultaneously at their full single-port speed. Network datagrams may be dynamically distributed across ports so that administration of what datagrams actually flow across a given port may be taken care of automatically with the LAG.

A LAG control protocol (LACP), such as the LACP set forth in IEEE 802.3ad, allows one or more links to be aggregated together to form a LAG. Once implemented, the LAG can be configured and reconfigured quickly and automatically with a low risk of duplication or rendering of frames.

Load balancing may be used across multiple parallel links between two network devices. One method of load balancing used today is based on an Internet Protocol (IP) header data address. Another method, which may be used for non-IP protocols and for double-tagged frames, is based on a media access control (MAC) address. A LAG may provide local link protection. Should one of the multiple links used in a LAG fail, network traffic (e.g., datagrams) may be dynamically redirected to flow across the remaining good links in the LAG. The redirection may be triggered because of dynamic hashing to surviving LAG links The network device may send the datagrams to the surviving LAG links, and the network may continue to operate with virtually no interruption in service.

Some LAG designs use two equal capacity links (e.g., two (1) gigabyte-per-second (Gbps) links) in a LAG, and the two links may attempt to protect each other. However, current load balancing methods do not guarantee even distribution of traffic among LAG links For example, a LAG with two (1) Gbps links has an aggregated capacity of (2) Gbps, but may not be able to support the aggregated capacity because the traffic may not be evenly assigned to the two links (i.e., one link may be congested and the other link may be underutilized). Furthermore, current load balancing methods do not fully protect traffic during link failure. To protect traffic during a link failure, the traffic load per service class handled by the LAG may be adjusted for oversubscription (i.e., connecting multiple devices to the same port to optimize network device use) and/or may not exceed one link capacity. For example, in order to protect traffic if a link fails, a LAG using two (1) Gbps links may not commit to more than a (1) Gbps traffic load, and each service class may not go beyond its bandwidth designed for a single link. This may result in wasted bandwidth.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide a bandwidth-based admission control mechanism for allocating traffic bandwidth on a LAG defined in a network (e.g., a switched network for point-to-point Ethernet Virtual Connections (EVCs)). The mechanism may address the available bandwidth on an Ethernet LAG, and may take into account a number of links in the LAG, availability, oversubscription, class of service (CoS), and load balancing uncertainty on links in the LAG.

Figure 1:
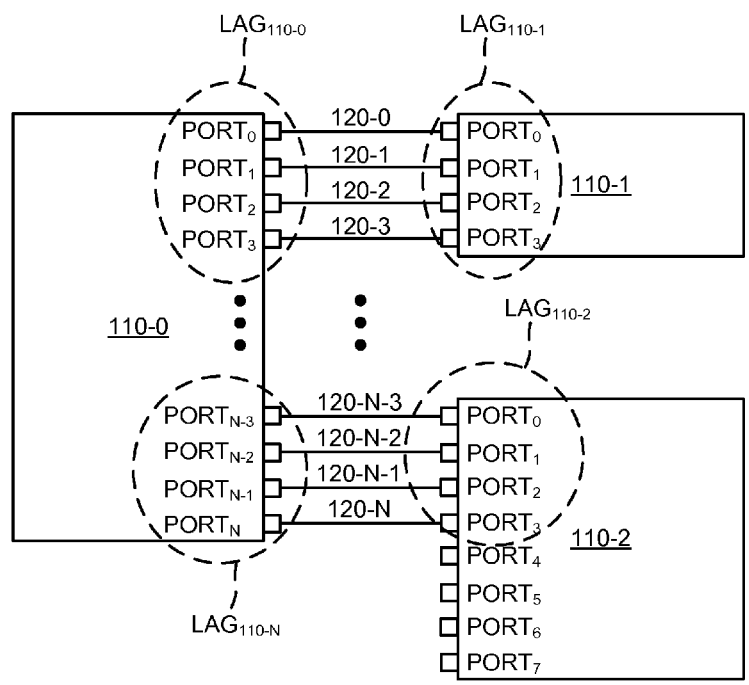
FIG. 1 is an exemplary diagram of a network in which systems and methods described herein may be implemented.

FIG. 1 is a diagram illustrating an exemplary network 100 in which systems and methods described herein may be implemented. Network 100 may include, for example, a local area network (LAN), a private network (e.g., a company intranet), a wide area network (WAN), a metropolitan area network (MAN), and/or another type of network. In one implementation, network 100 may include a switched network that provides point-to-point Ethernet services on backbone links known as Ethernet Relay Services (ERS).

As shown in FIG. 1, network 100 may include network devices 110-0, 110-1 and 110-2 (collectively referred to as network devices 110) interconnected by links 120-0, ..., 120-N (collectively referred to as links 120). While three network devices 110 and eight links 120 are shown in FIG. 1, more or fewer network devices 110 and/or links 120 may be used in other implementations.

Network device 110 may include a variety of devices. For example, network device 110 may include a computer, a router, a switch, a network interface card (NIC), a hub, a bridge, etc. Links 120 may include a path that permits communication among network devices 110, such as wired and/or wireless connections, input ports, output ports, etc. For example, network device 110-0 may include ports $PORT_0$, $PORT_1$, ..., $PORT_N$, network device 110-1 may include ports $PORT_0$, $PORT_1$, $PORT_2$, $PORT_3$, and network device 110-2 may include ports $PORT_0$, $PORT_1$, ..., $PORT_7$. The ports of network devices 110 may be considered part of corresponding links 120 and may be either input ports, output ports, or combinations of input and output ports. While eight ports for network device 110-0, four ports for network device 110-1, and eight ports for network device 110-2 are shown in FIG. 1, more or fewer ports may be used in other implementations.

In an exemplary implementation, network devices 110 may provide entry and/or exit points for datagrams (e.g., traffic) in network 100. Since Ethernet may be bi-directional, the ports (e.g., $PORT_0, \ldots,$ and $PORT_N$) of network device 110-0 may send and/or receive datagrams. The ports (e.g., $PORT_0, PORT_1, PORT_2,$ and $PORT_3$) of network device 110-1 and the ports (e.g., $PORT_0, \ldots,$ and $PORT_7$) of network device 110-2 may likewise send and/or receive datagrams.

In one implementation, a LAG may be established between network devices 110-0 and 110-1. For example, ports $PORT_0, \ldots,$ and $PORT_3$ of network device 110-0 may be grouped together into a $LAG_{110-0}$ that may communicate bi-directionally with ports $PORT_0, PORT_1, PORT_2,$ and $PORT_3$ of network device 110-1, via links 120-0, 120-1, 120-2, and 120-3. Ports $PORT_0, PORT_1, PORT_2,$ and $PORT_3$ of network device 110-1 may be grouped together into a $LAG_{110-1}$. $LAG_{110-0}$ and $LAG_{110-1}$ may permit ports $PORT_0, PORT_1, PORT_2,$ and $PORT_3$ of network device 110-0 and ports $PORT_0, PORT_1, PORT_2,$ and $PORT_3$ of network device 110-1 to communicate bi-directionally. Datagrams may be dynamically distributed between ports (e.g., $PORT_0, PORT_1, PORT_2,$ and $PORT_3$) of network device 110-0 and ports (e.g., $PORT_0, PORT_1, PORT_2,$ and $PORT_3$) of network device 110-1 so that administration of what datagrams actually flow across a given link (e.g., links 120-0, . . . , and 120-3) may be automatically handled by $LAG_{110-0}$ and $LAG_{110-1}$.

In another implementation, a LAG may be established between network devices 110-0 and 110-2. For example, ports $PORT_{N-3}, \ldots,$ and $PORT_N$ of network device 110-0 may be grouped together into a $LAG_{110-N}$ that may communicate bi-directionally with ports $PORT_0, PORT_1, PORT_2,$ and $PORT_3$ of network device 110-2, via links 120-N-3, 120-N-2, 120-N-1, and 120-N. Ports $PORT_0, PORT_1, PORT_2,$ and $PORT_3$ of network device 110-2 may be grouped together into a $LAG_{110-2}$. $LAG_{110-N}$ and $LAG_{110-2}$ may permit ports $PORT_{N-3}, \ldots,$ and $PORT_N$ of network device 110-0 and ports $PORT_0, PORT_1, PORT_2,$ and $PORT_3$ of network device 110-2 to communicate bi-directionally. Datagrams may be dynamically distributed between ports (e.g., $PORT_{N-3}, \ldots,$ and $PORT_N$) of network device 110-0 and ports (e.g., $PORT_0, PORT_1, PORT_2,$ and $PORT_3$) of network device 110-2 so that administration of what datagrams actually flow across a given link (e.g., links 120-N-3, . . . , and 120-N) may be automatically handled by $LAG_{110-N}$ and $LAG_{110-2}$. With such an arrangement, network devices 110 may transmit and receive datagrams simultaneously on all links within a LAG established by network devices 110.

Although FIG. 1 shows exemplary components of network 100, in other implementations, network 100 may contain fewer, different, or additional components than depicted in FIG. 1. In still other implementations, one or more components of network 100 may perform the tasks performed by one or more other components of network 100.

Figure 2:
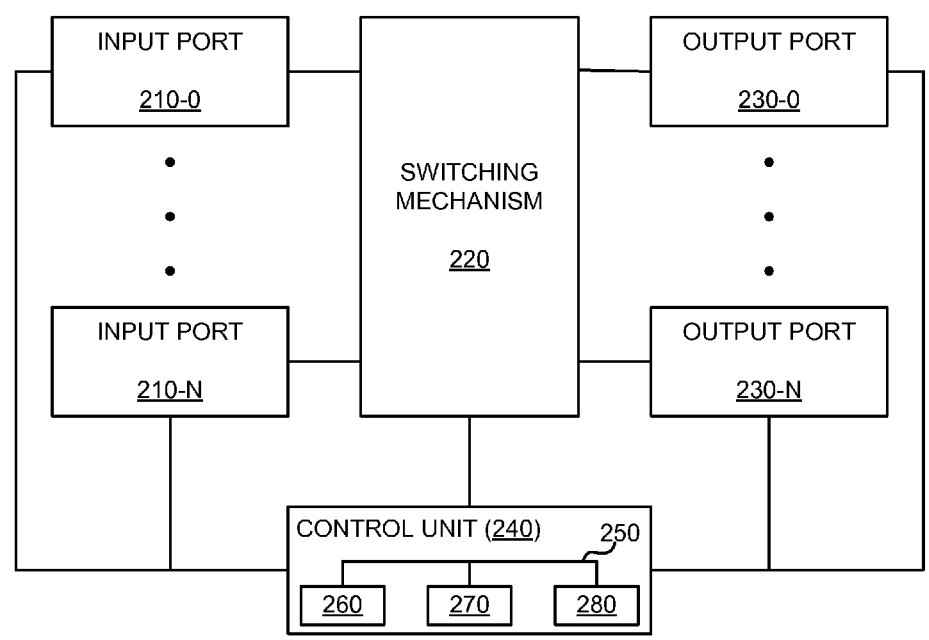
FIG. 2 is a diagram of an exemplary network device of FIG. 1.

FIG. 2 is an exemplary diagram of a device that may correspond to one of network devices 110 of FIG. 1. The device may include input ports 210, a switching mechanism 220, output ports 230, and a control unit 240. Input ports 210 may be the point of attachment for a physical link (e.g., link 120) (not shown) and may be the point of entry for incoming datagrams. Switching mechanism 220 may interconnect input ports 210 with output ports 230. Output ports 230 may store datagrams and may schedule datagrams for service on an output link (e.g., link 120) (not shown). Control unit 240 may use routing protocols and one or more forwarding tables.

Input ports 210 may carry out data link layer encapsulation and decapsulation. Input ports 210 may look up a destination address of an incoming datagram in a forwarding table to determine its destination port (i.e., route lookup). In order to provide quality of service (QoS) guarantees, input ports 210 may classify datagrams into predefined service classes. Input ports 210 may run data link-level protocols or network-level protocols. In other implementations, input ports 210 may be ports that send (e.g., may be an exit point) and/or receive (e.g., may be an entry point) datagrams.

Switching mechanism 220 may be implemented using many different techniques. For example, switching mechanism 220 may include busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming datagrams may be stored in a shared memory and pointers to datagrams may be switched.

Output ports 230 may store datagrams before they are transmitted on an output link (e.g., link 120). Output ports 230 may include scheduling algorithms that support priorities and guarantees. Output ports 230 may support data link layer encapsulation and decapsulation, and/or a variety of higher-level protocols. In other implementations, output ports 230 may send (e.g., may be an exit point) and/or receive (e.g., may be an entry point) datagrams.

Control unit 240 may interconnect with input ports 210, switching mechanism 220, and output ports 230. Control unit 240 may compute a forwarding table, implement routing protocols, and/or run software to configure and manage network device 110. Control unit 240 may handle any datagram whose destination address may not be found in the forwarding table.

In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110 may perform certain operations, as described herein. Network device 110 may perform these operations in response to processor 260 executing software instructions contained in a computer-readable medium, such as memory 270. A computer-readable medium may be defined as a physical or logical memory device and/or carrier wave.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 110, in other implementations, network device 110 may contain fewer, different, or additional components than depicted in FIG. 2. In still other implementations, one or more components of network device 110 may perform the tasks performed by one or more other components of network device 110.

Figure 3:
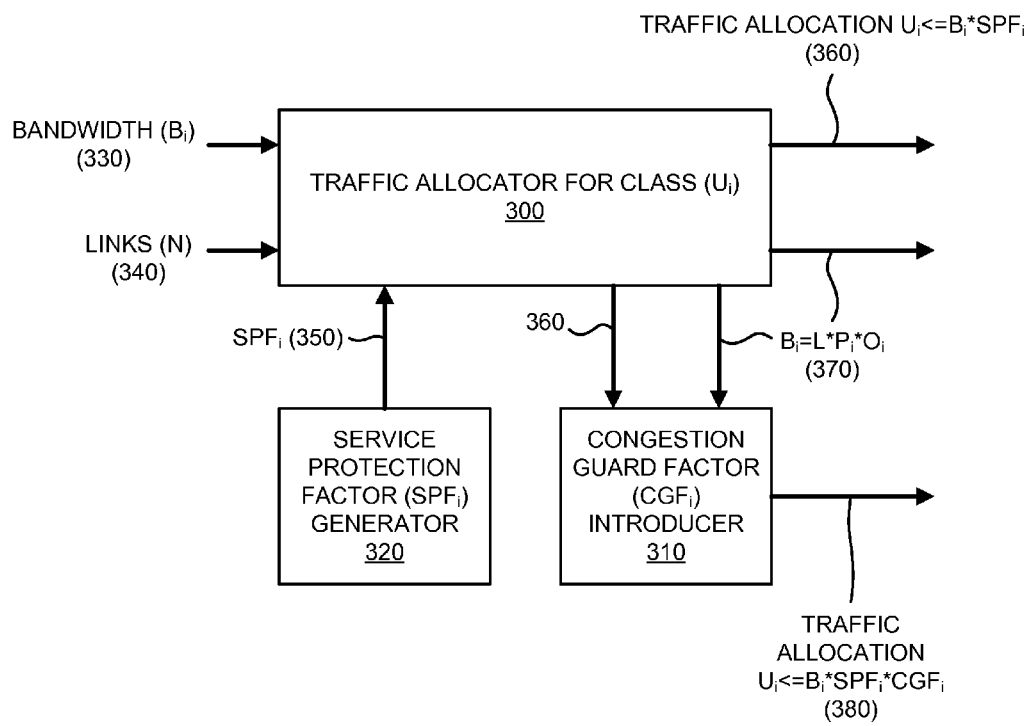
FIG. 3 is a functional block diagram showing exemplary functional components of a control unit of the network device of FIG. 2.

FIG. 3 is a functional block diagram showing exemplary functional components of control unit 240. As shown, control unit 240 may include a variety of functional components, such as a bandwidth allocator for class (i) 300, a congestion guard factor ($CGF_i$) introducer 310, and/or a service protection factor ($SPF_i$) generator 320. Each of the functional components shown in FIG. 3 may be interrelated with each other.

Bandwidth allocator for class (i) 300 may reserve bandwidth on a LAG for protected traffic. Bandwidth allocator for class (i) 300 may receive a bandwidth ($B_i$) 330 allocated for a service class (i) on the LAG, and a number of links (N) 340 in the LAG. Bandwidth allocator for class (i) 300 may also receive a service protection factor ($SPF_i$) 350 for service class (i) from service protection factor ($SPF_i$) generator 320. In one implementation, bandwidth allocator for class (i) 300 may account for oversubscription, and may assume that traffic is spread evenly across number of links (N) 340 in the LAG in order to determine an allocated bandwidth ($U_i$) 360 on the LAG for class (i). For example, bandwidth allocator for class (i) 300 may bound allocated bandwidth ($U_i$) 360 on the LAG for class (i) according to the following equations:

$$U_i \leq B_i * SPF_i \quad (1)$$

where $$0 < SPF_i \leq 1 \quad (2)$$

and $$B_i = L * P_i * O_i \quad (3).$$

(L) may refer to the LAG bandwidth, ($P_i$) may refer to the fraction of the raw link capacity allocated for service class (i), and ($O_i$) may refer to an oversubscription factor for service class (i).

As shown by equations (1)-(3), a higher service protection factor ($SPF_i$) 350 value (i.e., closer to "1"), may lower the protection that class (i) may be provided if a link fails. For example, assume that traffic is evenly spread across links in the LAG as a result of load balancing, and that no class can steal bandwidth from another class on the LAG after a link failure in the LAG. The maximum protection that service class (i) may receive on a LAG having links (N), if a link in the LAG fails, may be obtained by setting the service protection factor ($SPF_i$) value to (1−1/N). If a link fails, (1/N) of the LAG capacity may be lost. If ($B_i$/N) is assumed to be the bandwidth allocated per link, and ($B_i$−$B_i$/N) at a maximum may be booked for service class (i) over the failing link, then the bandwidth available on the LAG after link failure may be ($B_i$−$B_i$/N), i.e., the maximum bookable bandwidth. On the other hand, if the service protection factor ($SPF_i$) value is set to "1," then the maximum bookable bandwidth may be ($B_i$). Thus, after link failure, the bandwidth available to service class (i) may be ($B_i$−$B_i$/N), which is less than the bookable bandwidth by ($B_i$/N).

Congestion guard factor ($CGF_i$) introducer 310 may receive allocates bandwidth ($U_i$) 360 (as indicated by equation (1) above), and a bandwidth 370 (as indicated by equation (3) above) from bandwidth allocator for class (i) 300. In one implementation, congestion guard factor ($CGF_i$) introducer 310 may protect against congestion that may arise from biases in the spread of traffic across the LAG by introducing a congestion guard factor ($CGF_i$), which may restrict the amount of bandwidth that may be allocated on the LAG in order to reduce the probability that a single link in the LAG may be overloaded. For example, congestion guard factor ($CGF_i$) introducer 310 may determine the bandwidth that can be allocated on the LAG according to the following equations:

$$U_i \leq B_i * SPF_i * CGF_i \quad (4)$$

where $$0 < CGF_i \leq 1 \quad (5).$$

Congestion guard factor ($CGF_i$) introducer 310 may generate a traffic allocation 380 based on equation (4). Traffic allocation 380 may be used by network device 110 to allocate bandwidth on a LAG in network 100.

Service protection factor ($SPF_i$) generator 320 may generate service protection factor ($SPF_i$) 350, and may provide service protection factor ($SPF_i$) 350 to bandwidth allocator for class (i) 300. Service protection factor ($SPF_i$) 350 may be used to protect traffic from service class (i) in the event of a link failure in the LAG. Examples of service class (i) may include Ethernet-Relay Service Real Time (ERS-RT), Ethernet-Relay Service-Priority Data (ERS-PD), and other non-ERS-RT services, whereby the ERS-RT traffic may be served with a strict priority (i.e., may always transmit if it has demand), while the other services may receive an allocation of the LAG bandwidth and may be limited to the allocated share by scheduling. If the full bandwidth budgeted for ERS-RT on a LAG is allocated for traffic, this traffic may preempt ERS-PD and other non-ERS-RT traffic on surviving links if a link fails in the LAG. This may occur automatically as a by-product of a strict priority service assigned to ERS-RT traffic. While this may degrade the non-ERS-RT services in proportion to their allocated bandwidths, it may be acceptable based on a risk-cost assessment as it may allow more of the link capacity to be used under normal quiescent conditions for traffic booking On the other hand, if (1−1/N) of the bandwidth allocated for ERS-RT traffic is made bookable, the ERS-RT traffic may not cause degradation of the other non-ERS-RT services if a single link in the LAG fails and traffic is evenly spread across the links. In this latter case, service protection factor ($SPF_i$) 350 may be chosen as (1−1/N)<= SPF<=1 for services other than ERS-RT services. Additional details of service protection factor ($SPF_i$) generator 320 and generation of service protection factor ($SPF_i$) 350 are provided below in connection with FIG. 4.

Although FIG. 3 shows exemplary functional components of control unit 240, in other implementations, control unit 240 may contain fewer, different, or additional functional components than depicted in FIG. 3. In still other implementations, one or more functional components of control unit 240 may perform the tasks performed by one or more other functional components of control unit 240.

Figure 4:
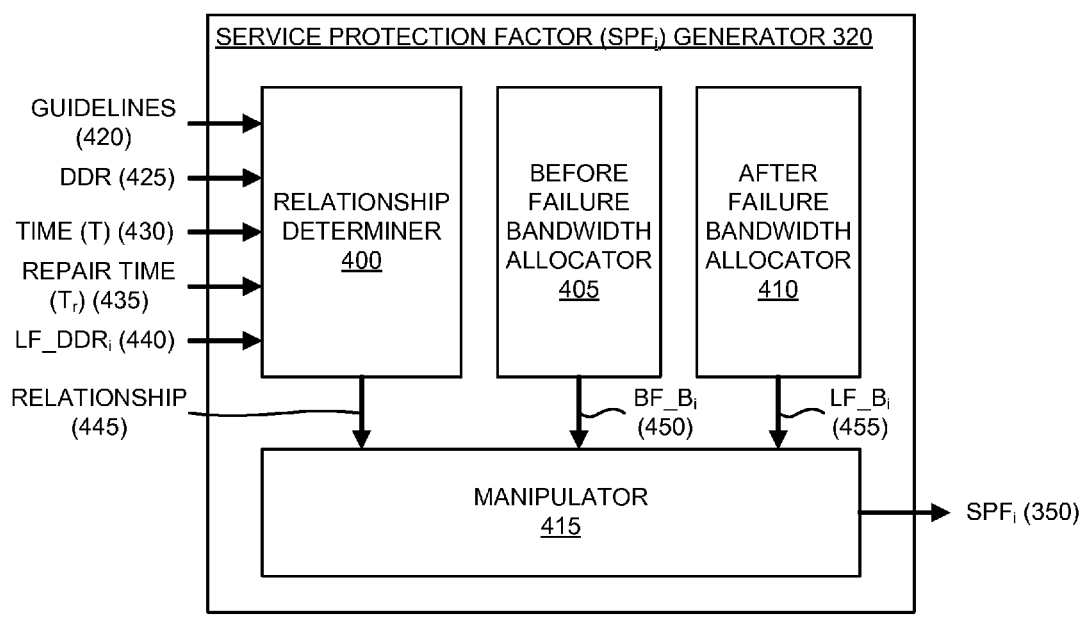
FIG. 4 is a functional block diagram showing exemplary functional components of a service protection factor generator of the control unit illustrated in FIG. 3.

FIG. 4 is a functional block diagram showing exemplary functional components of service protection factor ($SPF_i$) generator 320. As shown, service protection factor ($SPF_i$) generator 320 may include a variety of functional components, such as a relationship determiner 400, a before failure bandwidth allocator 405, an after failure bandwidth allocator 410, and/or a manipulator 415. Each of the functional components shown in FIG. 4 may be interrelated with each other.

Relationship determiner 400 may receive a variety of information, such as guidelines 420, a Data Delivery Ratio ($DDR_i$) 425, a time period (T) 430, a mean time to repair ($T_r$) 435, and/or a Data Delivery Ratio after link failure ($LF\_DDR_i$) 440. Guidelines 420 may include, for example, guidelines that ERS-RT traffic is to have an oversubscription factor of "1." If ERS-RT traffic is assigned a strict priority queue, ERS-RT traffic may be protected. Any additional bandwidth taken by ERS-RT traffic, if a link fails, from the remaining LAG capacity beyond a designated allocation may be bandwidth lost by other service classes (e.g., non-ERS-RT traffic). Data Delivery Ratio ($DDR_i$) 425 may be tied to service protection factor ($SPF_i$) 350, and may include the DDR for service class (i), as measured over time period (T) 430 (e.g., in seconds). Mean time to repair ($T_r$) 435 may include the mean time to repair failed links that have the same characteristics (e.g., same speed, same bandwidth allocation to traffic classes, same LAGs, etc.). ($LF\_DDR_i$) 440 may refer to a portion of Data Delivery Ratio ($DDR_i$) 425 that may be budgeted for link failures.

Using the aforementioned information, relationship determiner 400 may calculate a relationship 445 between time period (T) 430, mean time to repair ($T_r$) 435, and ($LF\_DDR_i$) 440. Relationship 445 may be calculated according to the following equation:

$$T_r * (BF\_B_i - LF\_B_i) = (1 - LF\_DDR_i) * T * BF\_B \quad (6).$$

($LF\_B_i$) may refer to the remaining bandwidth for service class (i) on a LAG after failure of one link on the LAG, and ($BF\_B_i$) may refer to the bandwidth allocated for service class (i) on the LAG before the link failure. Relationship determiner 400 may provide relationship 445 to manipulator 415.

Before failure bandwidth allocator 405 may calculate a bandwidth allocated for service class (i) on the LAG before the link failure (i.e., ($BF\_B_i$) 450). In one implementation, before failure bandwidth allocator 405 may calculate ($BF\_B_i$) 450 according to the following equation:

$$BF\_B_i = SPF_i * CGF_i * (L - B_0) * w_i \quad (7).$$

(L) may refer to a raw link capacity before failure, ($B_0$) may refer to an allocated bandwidth for ERS-RT traffic, and ($w_i$) may refer to a weight assigned to service class (i) relative to other classes. Before failure bandwidth allocator 405 may provide ($BF\_B_i$) 450 to manipulator 415.

After failure bandwidth allocator 410 may calculate a bandwidth allocated for service class (i) on the LAG after the link failure (i.e., ($LF\_B_i$) 455). In one implementation, after failure bandwidth allocator 410 may calculate ($LF\_B_i$) 455 according to the following equations:

$$LF\_B_i = \left(L - U_0 - \frac{L}{N}\right) * w_i, \text{ if } N = 2 \quad (8)$$

$$LF\_B_i = \left(L - U_0 - \frac{L}{N}\right) * w_i * CGF_i, \text{ if } N > 2. \quad (9)$$

($U_0$) may refer to a bookable bandwidth for ERS-RT traffic. After failure bandwidth allocator 410 may provide ($LF\_B_i$) 455 to manipulator 415. In one example, it may be assumed for equations (8) and (9) that the bookable bandwidth for ERS-RT traffic is provisioned to users and utilized by the users and by network Layer 2 Control Protocol (L2CP) traffic, and that traffic is spread evenly across links after failure.

Manipulator 415 may receive relationship 445, ($BF\_B_i$) 450, and ($LF\_B_i$) 455, and may determine service protection factor ($SPF_i$) 350 based on relationship 445, ($BF\_B_i$) 450, and ($LF\_B_i$) 455. In one implementation, manipulator 415 may determine service protection factor ($SPF_i$) 350 according to the following equations:

$$SPF_i = \frac{T_r * \left(L - U_0 - \frac{L}{N}\right)}{(L - B_0) * CGF_i * (T_r - T + LF\_DDR_i * T)}, \text{ if } N = 2 \quad (10)$$

$$SPF_i = \frac{T_r * \left(L - U_0 - \frac{L}{N}\right)}{(L - B_0) * (T_r - T + LF\_DDR_i * T)}, \text{ if } N > 2. \quad (11)$$

Manipulator 415 may provide service protection factor ($SPF_i$) 350 to bandwidth allocator for class (i) 300 (FIG. 3).

Although FIG. 4 shows exemplary functional components of service protection factor ($SPF_i$) generator 320, in other implementations, service protection factor ($SPF_i$) generator 320 may contain fewer, different, or additional functional components than depicted in FIG. 4. In still other implementations, one or more functional components of service protection factor ($SPF_i$) generator 320 may perform the tasks performed by one or more other functional components of service protection factor ($SPF_i$) generator 320.

Figure 5:
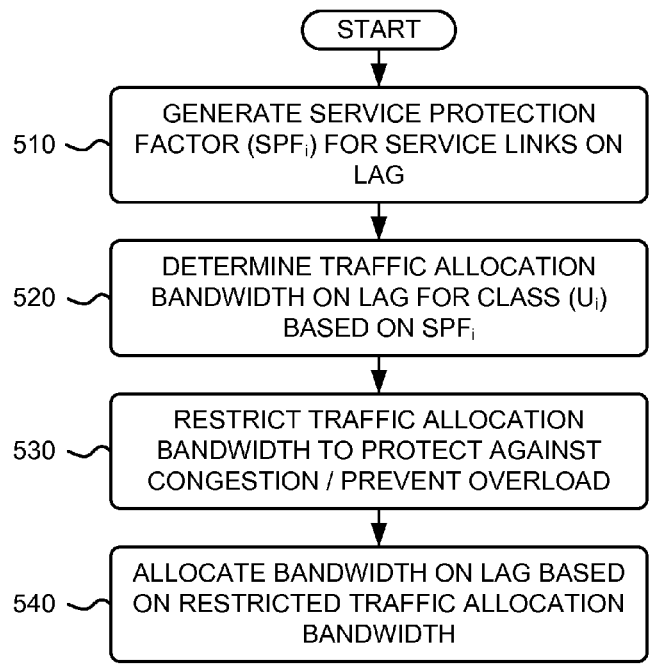
FIGS. 5 and 6 depict a flowchart of an exemplary process for a network and/or a network device of FIG. 1 according to implementations described herein.
Figure 6:
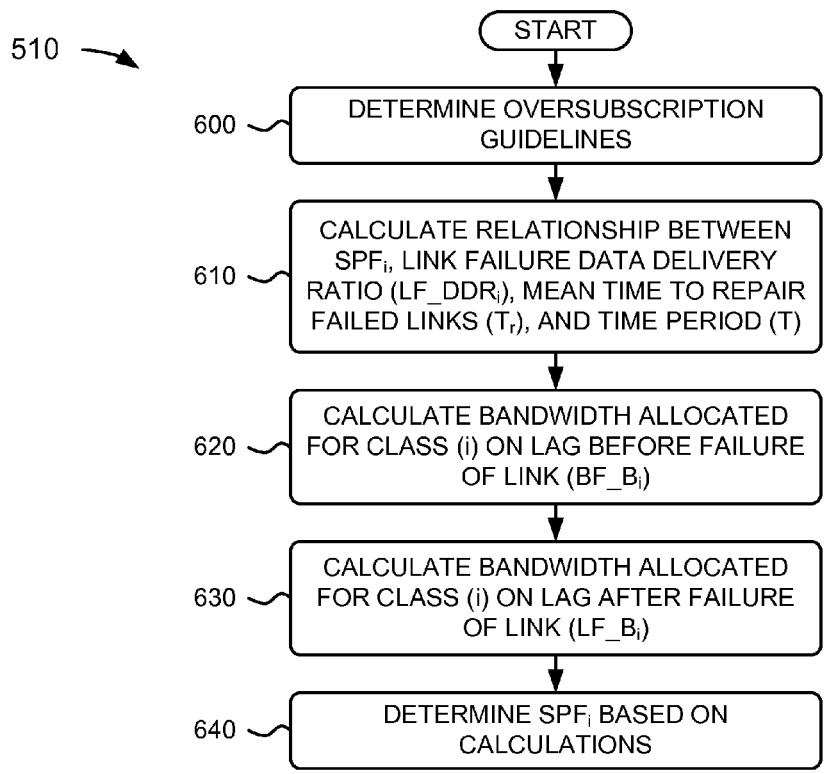

FIGS. 5 and 6 depict a flowchart of an exemplary process 500 for a network (e.g., network 100) and/or a network device (e.g., network device 110, a network management system, etc.). In one implementation, the process of FIGS. 5 and 6 may be performed by a device of a network or may be performed by a device external to the network, but communicating with the network. In other implementations, the process of FIGS. 5 and 6 may be performed by network device 110 (e.g., by control unit 240) and/or one or more devices in network 100.

As shown in FIG. 5, process 500 may begin with generation of a service protection factor ($SPF_i$) for service links on a LAG (block 510). For example, in one implementation described above in connection with FIG. 3, service protection factor ($SPF_i$) generator 320 may generate service protection factor ($SPF_i$) 350, and may provide service protection factor ($SPF_i$) 350 to bandwidth allocator for class (i) 300. Service protection factor ($SPF_i$) 350 may be used to protect traffic from service class (i) in the event of a link failure in the LAG.

A traffic allocation bandwidth on the LAG may be determined for a class (i) based on the service protection factor ($SPF_i$) (block 520). For example, in one implementation described above in connection with FIG. 3, bandwidth allocator for class (i) 300 may reserve bandwidth on a LAG for protected traffic. In one example, bandwidth allocator for class (i) 300 may account for oversubscription, and may assume that traffic is spread evenly across number of links (N) 340 in the LAG in order to determine allocated bandwidth ($U_i$) 360 on the LAG for class (i).

As further shown in FIG. 5, the traffic allocation bandwidth may be restricted to protect against congestion and/or to prevent overload (block 530). For example, in one implementation described above in connection with FIG. 3, congestion guard factor ($CGF_i$) introducer 310 may protect against congestion that may arise from biases in the spread of traffic across the LAG by introducing a congestion guard factor ($CGF_i$), which may restrict the amount of bandwidth that may be allocated on the LAG in order to reduce the probability that a single link in the LAG may be overloaded.

Bandwidth may be allocated on the LAG based on the restricted traffic allocation bandwidth (block 540). For example, in one implementation described above in connection with FIG. 3, congestion guard factor ($CGF_i$) introducer 310 may generate a traffic allocation 380 based on Equation (4) (e.g., $U_i \leq B_i * SPF_i * CGF_i$). Traffic allocation 380 may be used by network device 110 to allocate bandwidth on a LAG in network 100.

Process block 510 (FIG. 5) of process 500 may include the blocks shown in FIG. 6. Thus, process block 510 may begin with the determination of oversubscription guidelines (block 600). For example, in one implementation described above in connection with FIG. 4, relationship determiner 400 may receive a variety of information, such as guidelines 420. In one example, guidelines 420 may include guidelines that ERS-RT traffic is to have an oversubscription factor of "1." If ERS-RT traffic is assigned a strict priority queue, ERS-RT traffic may be protected. Any additional bandwidth taken by ERS-RT traffic, if a link fails, from the remaining LAG capacity beyond a designated allocation may be bandwidth lost by other service classes (e.g., non-ERS-RT traffic). In other implementations, guidelines 420 may include other oversubscription guidelines (e.g., that ERS-RT traffic is to have an oversubscription factor of less than "1").

As further shown in FIG. 6, a relationship between service protection factor ($SPF_i$), a data delivery ratio after link failure ($LF\_DDR_i$), a time period (T), and a mean time to repair failed links ($T_r$) may be calculated (block 610). For example, in one implementation described above in connection with FIG. 4, relationship determiner 400 may calculate relationship 445 between service protection factor ($SPF_i$) 350, time period (T) 430, mean time to repair ($T_r$) 435, and ($LF\_DDR_i$) 440. In one example, relationship 445 may be calculated according to Equation (6), provided above.

A bandwidth allocated for a service class (i) on the LAG before link failure ($BF\_B_i$) may be calculated (block 620). For example, in one implementation described above in connection with FIG. 4, before failure bandwidth allocator 405 may calculate a bandwidth allocated for service class (i) on the LAG before the link failure (i.e., ($BF\_B_i$) 450). In one example, before failure bandwidth allocator 405 may calculate ($BF\_B_i$) 450 according to Equation (7), provided above.

As further shown in FIG. 6, a bandwidth allocated for the service class (i) on the LAG after link failure ($LF\_B_i$) may be calculated (block 630). For example, in one implementation described above in connection with FIG. 4, after failure bandwidth allocator 410 may calculate a bandwidth allocated for service class (i) on the LAG after the link failure (i.e., ($LF\_B_i$) 455). In one example, after failure bandwidth allocator 410 may calculate ($LF\_B_i$) 455 according to Equations (8) and (9).

The service protection factor ($SPF_i$) may be determined based on the calculations performed in blocks 610-630 (block 640). For example, in one implementation described above in connection with FIG. 4, manipulator 415 may receive relationship 445, ($BF\_B_i$) 450, and ($LF\_B_i$) 455, and may determine service protection factor ($SPF_i$) 350 based on relationship 445, ($BF\_B_i$) 450, and ($LF\_B_i$) 455. In one example, manipulator 415 may determine service protection factor ($SPF_i$) 350 according to Equations (10) and (11), provided above. Manipulator 415 may provide service protection factor ($SPF_i$) 350 to bandwidth allocator for class (i) 300 (FIG. 3).

Implementations described herein may provide a bandwidth-based admission control mechanism for allocating traffic bandwidth on a LAG defined in a network (e.g., a switched network for point-to-point Ethernet Virtual Connections (EVCs)). The mechanism may address the available bandwidth on an Ethernet LAG, and may take into account a number of links in the LAG, availability, oversubscription, class of service (CoS), and load balancing uncertainty on links in the LAG.

The foregoing description provides illustration and description, but is not intended to be exhaustive or to limit the invention to the precise form disclosed. Modifications and variations are possible in light of the above teachings or may be acquired from practice of the invention.

For example, while a series of acts have been described with regard to the flowcharts of FIGS. 5 and 6, the order of the acts may differ in other implementations. Further, non-dependent acts may be performed in parallel. In another example, although FIGS. 3 and 4 show tasks being performed by functional components of control unit 240 of network device 110, in other implementations, the tasks shown in FIGS. 3 and 4 may be performed by other components of network device 110, such as, e.g., switching mechanism 220. Alternatively, some of the tasks shown in FIGS. 3 and 4 may be performed by another device (outside network device 110).

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
    determining, by a relationship determining component of the computing device, a relationship between a data delivery ratio after link failure ($LF\_DDR_i$) associated with a time period (T), and a mean time to repair failed links ($T_r$) for a link aggregation group (LAG);
    determining, by a before failure bandwidth allocation component of the computing device, a bandwidth allocated for a service class on the LAG before link failure ($BF\_B_i$);
    determining, by an after failure bandwidth allocation component of the computing device, a bandwidth allocated for the service class on the LAG after link failure ($LF\_B_i$),
    sending the determined relationship, $BF\_B_i$, and $LF\_B_i$ to a manipulator component of the computing device, and
    generating, by the manipulator component, a service protection factor ($SPF_i$) based on the determined relationship, $BF\_B_i$, and $LF\_B_i$ for links (N) of the LAG.

2. The method of claim 1, where the $SPF_i$ is generated using different formulas based on a quantity of the links N.

3. The method of claim 2, where, when the quantity of the links N is two, the $SPF_i$ is generated based on a congestion guard factor ($CGF_i$).

4. The method of claim 1, further comprising:
    determining, by a bandwidth allocator component of the computing device, a traffic allocation bandwidth on the LAG for the service class based on the $SPF_i$.

5. The method of claim 4, further comprising:
restricting, by a congestion guard factor component of the computing device, a traffic allocation bandwidth on the LAG.

6. The method of claim 5, further comprising:
allocating, by the device, the traffic allocation bandwidth on the LAG based on the restricted traffic allocation bandwidth.

7. The method of claim 4, where determining the traffic allocation bandwidth includes:
determining the traffic allocation bandwidth for a class (i) based on an original bandwidth allocated for the service class ($B_i$) and the $SPF_i$.

8. The method of claim 1, where determining the relationship further includes:
determining the relationship based on $T_r$, $BF\_B_i$, $LF\_B_i$, $LF\_DDR_i$ and T.

9. The method of claim 1, where determining the B_F $B_i$ includes:
determining $BF\_B_i$ based on the $SPF_i$, a congestion guard factor ($CGF_i$), a raw link capacity before link failure (L), an allocated bandwidth for Ethernet Relay Service-Real Time (ERS-RT) traffic ($B_0$), and a weight assigned to the service class relative to other classes ($w_i$).

10. The method of claim 1, where different formulas are used to generate the $LF\_B_i$ based on a quantity of the links N.

11. The method of claim 10, where, when the quantity of the links N is two, determining the $LF\_B_i$ is based on a raw link capacity before link failure (L), a bookable bandwidth for ERS-RT traffic ($U_0$), the links N, and a weight assigned to the service class relative to other classes ($w_i$).

12. The method of claim 10, where, when the quantity of the links N is greater than two, determining the $LF\_B_i$ is based a raw link capacity before link failure (L), a bookable bandwidth for ERS-RT traffic ($U_0$), the links N, a weight assigned to the service class relative to other classes ($w_i$), and a congestion guard factor ($CGF_i$).

13. The method of claim 12, where determining the $SPF_i$ further includes:
determining the $SPF_i$ based on the L, $U_0$, an allocated bandwidth for Ethernet Relay Service-Real Time (ERS-RT) traffic ($B_0$), and $CGF_i$.

14. A system comprising:
hardware-implemented means for determining a relationship between a data delivery ratio after link failure ($LF\_DDR_i$) associated with a time period (T), and a mean time to repair failed links ($T_r$) for a link aggregation group (LAG);
hardware-implemented means for determining a bandwidth allocated for a service class on the LAG before link failure ($BF\_B_i$);
hardware-implemented means for determining a bandwidth allocated for the service class on the LAG after link failure ($LF\_B_i$),
hardware-implemented means for sending the determined relationship, $BF\_B_i$, and $LF\_B_i$ to a manipulator component of the computing device, and
hardware-implemented means for generating a service protection factor ($SPF_i$) based on the determined relationship, $BF\_B_i$, and $LF\_B_i$ for links (N) of the LAG.

15. A device, comprising:
a plurality of ports that connect to a plurality of links;
a relationship determining component to calculate a relationship between a data delivery ratio after link failure ($LF\_DDR_i$) associated with a time period (T), and a mean time to repair failed links ($T_r$), the relationship determining component being hardware-implemented;
a before failure bandwidth allocation component to calculate a bandwidth allocated for a service class on a link aggregation group (LAG), defined from two or more of the plurality of links, before link failure ($BF\_B_i$), the before failure bandwidth allocation component being hardware-implemented;
an after failure bandwidth allocation component to calculate a bandwidth allocated for the service class on the LAG after link failure ($LF\_B_i$), the after failure bandwidth allocation component being hardware-implemented; and
a hardware-implemented manipulator component to:
receive the relationship, $BF\_B_i$, and $LF\_B_i$, and
determine a service protection factor ($SPF_i$) for links (N) on the LAG based on the received relationship, $BF\_B_i$, and $LF\_B_i$.

16. The device of claim 15, further comprising:
a bandwidth allocator component to determine a traffic allocation bandwidth on the LAG for the service class based on the $SPF_i$, and
a congestion guard factor component to restrict the traffic allocation bandwidth on the LAG.

17. The device of claim 15, where the device is further to:
allocate bandwidth on the LAG based on the restricted traffic allocation bandwidth.

18. The device of claim 15, where the relationship determining component is further to:
calculate the relationship according to the following equation:

$$T_r*(BF\_B_i-LF\_B_i)=(1-LF\_DDR_i)*T*BF\_B_i.$$

19. The device of claim 15, where the before failure bandwidth allocation component is further to:
calculate $BF\_B_i$ according to the following equation:

$$BF\_B_i=SPF_i*CGF_i*(L-B_0)*w_i,$$

where $CGF_i$ is a congestion guard factor, L represents a raw link capacity before link failure, $B_0$ represents an allocated bandwidth for Ethernet Relay Service-Real Time (ERS-RT) traffic, and $w_i$ represents a weight assigned to the service class relative to other classes.

20. The device of claim 15, where the after failure bandwidth allocation component is further to:
calculate $LF\_B_i$ according to the following equations:

$$LF\_B_i = \left(L - U_0 - \frac{L}{N}\right)*w_i, \text{ if } N = 2, \text{ and}$$

$$LF\_B_i = \left(L - U_0 - \frac{L}{N}\right)*w_i*CGF_i, \text{ if } N > 2,$$

where $U_0$ represents a bookable bandwidth for Ethernet Relay Service-Real Time ERS-RT traffic, $CGF_i$ represents a congestion guard factor, L represents a raw link capacity before link failure, and $w_i$ represents a weight assigned to the service class relative to other classes.

21. The device of claim 15, where the manipulator component is further to:
determine the service protection factor ($SPF_i$) according to the following equations:

$$SPF_i = \frac{T_r*\left(L - U_0 - \frac{L}{N}\right)}{(L-B_0)*CGF_i*(T_r - T + LF\_DDR_i*T)}, \text{ if } N = 2, \text{ and}$$

$$SPF_i = \frac{T_r * \left(L - U_0 - \frac{L}{N}\right)}{(L - B_0) * (T_r - T + \text{LF\_DDR}_i * T)}, \text{ if } N > 2,$$

where $U_0$ represents a bookable bandwidth for Ethernet Relay Service-Real Time ERS-RT traffic, $CGF_i$ represents a congestion guard factor, $B_0$ represents an allocated bandwidth for Ethernet Relay Service-Real Time (ERS-RT) traffic, and L represents a raw link capacity before link failure, and $w_i$ represents a weight assigned to the service class relative to other classes.

* * * * *